(No Model.) 3 Sheets—Sheet 2.

G. Y. SMITH.
VERTICAL BOILER.

No. 498,450. Patented May 30, 1893.

Witnesses.
A. H. Opsahl
Frank L. Marchant

Inventor.
George Y. Smith
By Jas. F. Williamson
Attorney.

(No Model.) 3 Sheets—Sheet 3.
G. Y. SMITH.
VERTICAL BOILER.
No. 498,450. Patented May 30, 1893.
Fig. 3.
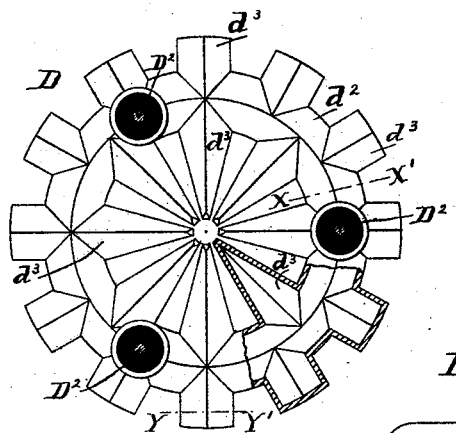
Fig. 6.
Fig. 4.
Fig. 5.
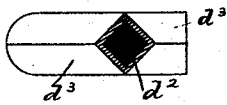
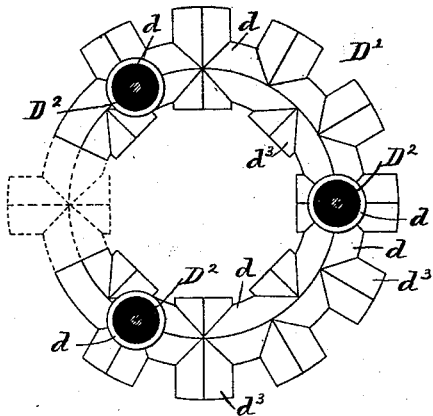
Witnesses.
A. H. Opsahl.
Frank D. Merchant.
Inventor.
George Y. Smith
By Jas. P. Williamson
Attorney

UNITED STATES PATENT OFFICE.

GEORGE Y. SMITH, OF MINNEAPOLIS, MINNESOTA, ASSIGNOR OF ONE-HALF TO FRED G. ATKINSON, OF SAME PLACE.

VERTICAL BOILER.

SPECIFICATION forming part of Letters Patent No. 498,450, dated May 30, 1893.

Application filed January 5, 1893. Serial No. 457,423. (No model.)

*To all whom it may concern:*

Be it known that I, GEORGE Y. SMITH, a citizen of the United States, residing at Minneapolis, in the county of Hennepin and State of Minnesota, have invented certain new and useful Improvements in Vertical Boilers; and I do hereby declare the following to be a full, clear, and exact description of the invention, such as will enable others skilled in the art to which it appertains to make and use the same.

My invention as herein shown and described, is especially designed for use as a steam boiler, with a view of increased evaporation for any given quantity of fuel, and with a view of economy of construction.

The invention is also capable of use as an air heater, or as a hot-water heater, with slight and obvious changes.

To these ends, the invention consists in certain novel devices and combinations of devices, which will be hereinafter fully described and be defined in the claims.

Figure 1:
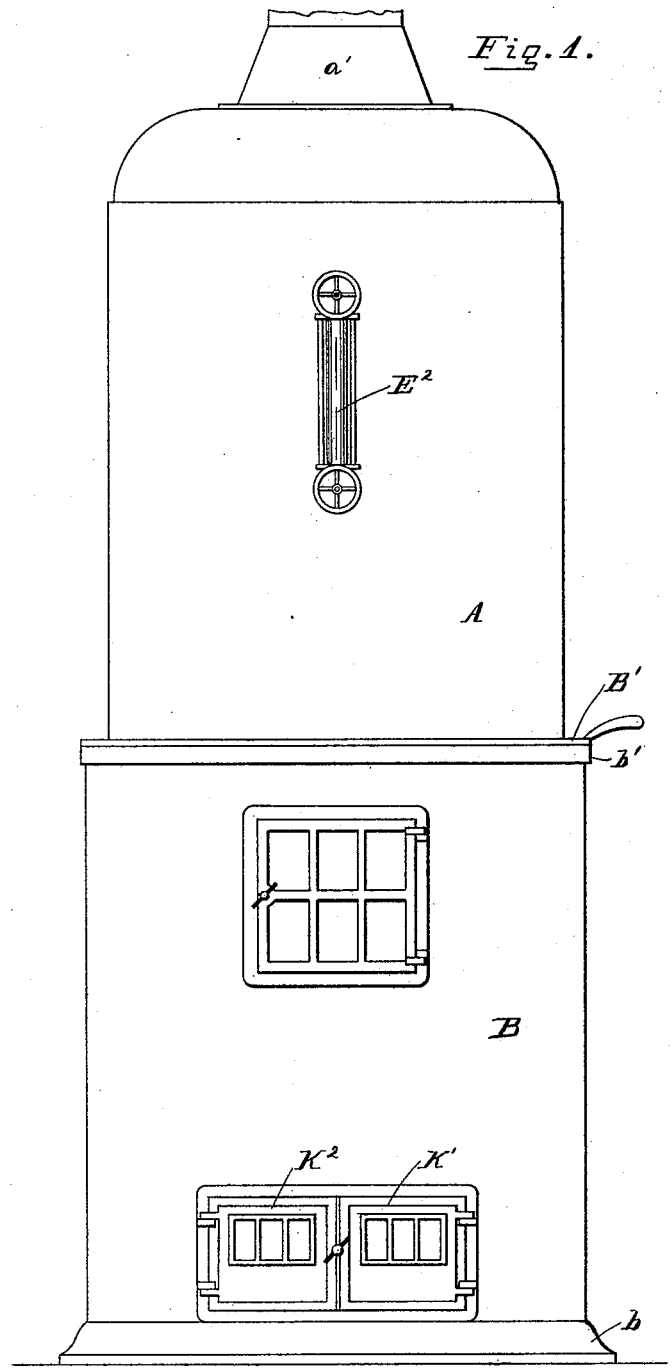
Figure 2:
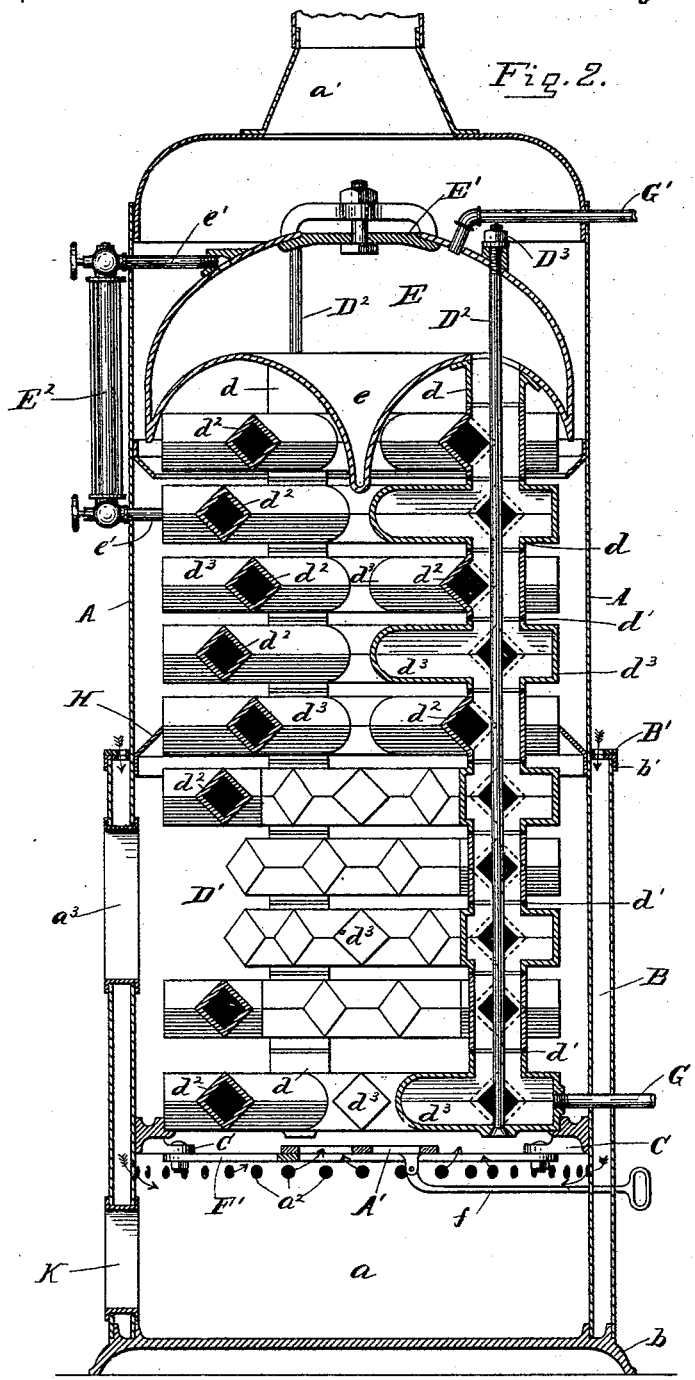

In the accompanying drawings, like letters referring to like parts, throughout the several views,—Figure 1 is a side elevation of my interchangeable boiler or heater. Fig. 2 is a vertical section of the same, from right to left, some parts being shown in elevation. Fig. 3 is a plan view of one of the castings, constituting the lowermost and the upper series of heating chambers; and Fig. 4 is a similar view of one of the castings, as modified to form the fire-pot or space, for holding the fuel. Fig. 5 is a cross section through the annulus or ring portion of one of the hollow castings, and Fig. 6 is a similar view through one of the radial projections from the annulus, taken respectively on the lines X X' and Y Y'.

A represents the shell or casing, made of any suitable shape and material, provided at its bottom with an ash-pan space $a$, and at its top with an outlet flue $a'$, for the products of combustion.

B represents an outside jacket surrounding the lower part of the casing, and spaced apart therefrom and connected therewith by suitable flanges $b\ b'$, of which the upper member $b'$ is provided with air-passages controlled by an ordinary circular register-plate B'.

The shell A is provided below the grate with air passages $a^2$ into the ash-pan space. This construction and relation of the shell A and jacket B, gives a means of heating the air, which is used for supporting the combustion, before it strikes the fuel.

C is an annular flange, secured inside the shell A, directly above the ash-pan space, and constituting the seat for supporting a series of heating chambers D D', all of which are in the form of hollow castings, arranged in the form of a vertical series of stack, in communication with each other by joint flanges $d$, and securely held together by rods $D^2$ and nuts $D^3$, engaging with the screw-threaded upper ends of the rods.

E is a steam dome, located at the top of the series of heating chambers or castings, and connected to the upper member of the series in the same way as the series of castings D D' are connected with each other.

The several castings D D', as well as the dome E, are provided with three of the joint flanges $d$, equally spaced apart and forming, when the castings and the dome are in position, continuous passages through which extend the clamping rods $D^2$, the lower ends of which are headed and draw against the lowermost casting, and the upper ends of which, as before stated, are screw-threaded and engaged by nuts $D^3$, bearing against the top of the dome, this construction serving to secure all the castings and the dome together into a rigid structure. The joints between the castings are rendered steam-tight by non-fusible gaskets or packing-rings $d'$, between the joint flanges $d$.

The castings D consist of an annulus or ring portion $d^2$, and radial hollow extensions $d^3$ projecting therefrom. The radial extensions $d^3$, are shown as extending both inward and outward from the annulus or body portion of the casting. It is of course obvious, that they might extend in one direction only, but this would give less radiating surface. The intermediate castings D' are of the same construction as the castings D, with the exception that they are cut away at a point coincident with the door $a^3$ in the shell A, for the admission of fuel, and with the further exception that the inside radial extensions $d^3$ are made shorter than on the castings D, so as to give more room for the fuel. The lower casting D co-operates with a sliding grate-center F, located thereunder, and sliding on fixed bars F', to form the grate for supporting the fuel. The sliding grate-center F is provided with a hand-rod $f$, extending to the exterior of the jacket B, for operating the same. It will thus be seen, that the grate is partially formed and the fire-pot entirely formed of the hollow castings or heating chambers D D', rendering these particular castings very effective for heating purposes, and saving the expense of an extra fire-pot.

G is the in-flow pipe, tapping the lowermost or grate casting D, for supplying the water or other medium to be heated, and G' is the outflow pipe, from the dome E, for conducting off the steam or other medium. The inflow and outflow pipes G G', are shown as of a size suitable for the use of the castings as a boiler; but it will be readily understood that the same could be made of any size, so as to render the apparatus suitable for use to heat air, or to effect a continuous circulation of water in a system of hot water heating.

The dome E has its lower or bottom plate constructed in the form of an inverted bell, the apex end of which projects downward as shown at $e$, into the central space between the top members of the castings D. The steam dome is provided with a hand-hole which is shown as closed by a hand-hole cover E', of the usual construction. A water-gage $E^2$ is shown on the exterior of the casing, with the usual circulating connections $e'$ to the steam dome, and one of the upper members of the castings D. The castings D D' are sufficiently less in diameter or other superficial dimension, to leave a small clearance space or passage between their outer surfaces and the shell A. The dome E is also of a less diameter than the casing A, so as to leave the necessary clearance for the passage of the products of combustion to the outlet flue $a'$; but is made preferably of somewhat greater diameter than the castings D D'.

At a point just above the fire-pot members of the castings, an annular flange H is interposed between the casing A and one of the castings D, to prevent the direct upward passage of the burning gases and force the same into the central spaces of the castings, the arrangement being such that the gases will be more or less focalized, rendering the combustion more complete. H' is a similar deflecting flange near the steam dome.

K is a thimble with outside doors K' into the ash-pan space, for access thereto, for any desired purpose, such as the insertion of a removable ash-pan, not shown.

Referring to the castings or hollow chambers D D', all parts of the same are rectangular in cross section, arranged with one diagonal of the same in the vertical plane. This form and arrangement of the castings gives a large series of dividing and deflecting surfaces, by which the ascending column of burning gases, is made to inwrap all portions of the castings, rendering the castings very efficient as heating chambers. The peculiar construction of the castings, having their bodies composed of an annulus, and provided with radial hollow extensions in each direction, gives a very large radiating surface. It will be seen, by reference to the drawings, that the diameters of the annulus portions of adjacent castings D are of different dimensions, and are arranged in alternate order, so that the products of combustion, on their upward passage will be alternately deflected to and from the center of the shell B.

The operation or use of the device is obvious. Water being supplied from the inflow pipe to the proper level in the series of castings and the fire started in the fuel chamber, the burning gases will envelop all parts of the series of castings surrounding the fuel, and be deflected in their ascent, by the deflecting flange H to the center of the casting directly above the fire-pot members, at which point the combustion will be intensified; and thence the burning gases will be thrown outward in every direction, and the direct ascending columns will strike the lower part of the steam dome and be directed outward and downward to the clearance spaces, and thence upward over the top of the dome to the outlet flue. It is obvious, that with this construction and arrangement of the heat medium chambers or castings D D', all portions of the heat from the burning gases, will be used or rendered effective on the water or other medium contained within the chambers.

The ash-space doors K' may be provided with registers $K^2$, for the admission of cold air, if the same be so desired. If these registers $K^2$ be closed and the register B' be opened, as shown in the drawings, then the air to support combustion at the grate and fire-pot, will be caused to encircle the fire-pot section of the shell A inside the jacket B, and will be more or less heated, before reaching the fuel.

It has already been stated, that by making the inflow and outflow pipes G G' of the proper dimensions, the apparatus might be readily used as a hot air furnace or a hot water heater. If it be desired to use the same as a furnace, the enlarged outflow pipe G' would be extended of course, and be provided with the necessary branches, for directing the hot air wherever desired. If the apparatus should be used as a hot water heater, the circulating sections and radiators would of course need to be added and might be of any suitable construction. The register B' b' extends entirely around the shell A, and the openings $a^2$ extend entire around the ash-pan space below the grate. This gives an even draft on all parts of the fire.

What I claim, and desire to secure by Letters Patent of the United States, is as follows:

1. The combination with a case or shell with air inlets and an exit flue, of the series of hollow castings D D', of which the castings D consist each of an annulus with hollow radial extensions, and the castings D' are constructed of similar form, with shorter radial arms, extending inward to form a fire-pot, and one or more of which are truncated for the admission of fuel, substantially as described.

2. The combination with the casing, having air inlets and an exit flue, and provided with a fuel admitting door, of the series of hollow castings D D', arranged in the form of a stack, with one of the castings D employed as a part of the grate, and with the castings D' employed to form the fire-pot, substantially as described.

3. A boiler comprising a suitable shell or casing with air inlets and an exit flue, a series of castings D D', and a steam dome E, with an inflow pipe for the water and an outflow pipe for the steam, and certain of the said castings being arranged to form the fire-pot for supporting the burning fuel, substantially as described.

4. A vertical boiler, comprising a suitable shell or casing with air inlets and an exit flue, the series of hollow castings D D', constructed and arranged as described, and the steam dome E having its bottom wall in the form of an inverted bell with the apex of the same extending downward into the central space between the upper members of the series of castings, substantially as described.

5. The combination with a suitable shell or casing, having air inlets, an exit flue, and a fuel admitting door, of the series of castings D D', constructed and arranged as described, a grate center cooperating with the lower member of said castings to form a grate, the steam dome E, the clamping bolts $D^2$ and nuts $D^3$ applied as described, to secure the said castings and dome rigidly together, and the inflow and outflow pipes G G', substantially as described.

In testimony whereof I affix my signature in presence of two witnesses.

GEORGE Y. SMITH.

Witnesses:
FRED. G. ATKINSON,
JAS. F. WILLIAMSON.